US011614070B2

(12) United States Patent
Ito et al.

(10) Patent No.: US 11,614,070 B2
(45) Date of Patent: Mar. 28, 2023

(54) VERTICAL AXIS WIND TURBINE, AND WIND POWER GENERATING DEVICE AND LIGHTING FACILITY COMPRISING SAME

(71) Applicant: NTN CORPORATION, Osaka (JP)

(72) Inventors: Takeru Ito, Kuwana (JP); Tatsuo Kawase, Kuwana (JP); Tatsuya Hayashi, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/102,896

(22) Filed: Nov. 24, 2020

(65) Prior Publication Data

US 2021/0095637 A1 Apr. 1, 2021

Related U.S. Application Data

(63) Continuation of application No. PCT/JP2019/020919, filed on May 27, 2019.

(30) Foreign Application Priority Data

May 29, 2018 (JP) .............................. JP2018-101989

(51) Int. Cl.
*F03D 3/00* (2006.01)
*F03D 9/11* (2016.01)
*F03D 3/06* (2006.01)
*F03D 9/00* (2016.01)

(52) U.S. Cl.
CPC ............. *F03D 3/005* (2013.01); *F03D 3/065* (2013.01); *F03D 9/007* (2013.01); *F03D 9/11* (2016.05)

(58) Field of Classification Search
CPC . F03D 3/005; F03D 9/11; F03D 3/065; F03D 9/007
See application file for complete search history.

(56) References Cited

U.S. PATENT DOCUMENTS

| 7,360,995 B2 | 4/2008 | Suzuki |
| 7,432,608 B2 | 10/2008 | Okubo et al. |
| 7,510,366 B2 | 3/2009 | Okubo et al. |
| 2006/0120872 A1 | 6/2006 | Okubo et al. |
| 2006/0145668 A1 | 7/2006 | Okubo et al. |

(Continued)

FOREIGN PATENT DOCUMENTS

| CN | 102748207 A | 10/2012 |
| JP | 2004-204801 A | 7/2004 |
| JP | 2005-61328 A | 3/2005 |

(Continued)

OTHER PUBLICATIONS

International Search Report dated Jul. 23, 2019 in International Patent Application No. PCT/JP2019/020919.

(Continued)

*Primary Examiner* — Viet P Nguyen

(57) ABSTRACT

A vertical axis wind turbine (2) includes a vertical rotation shaft (3a) and a plurality of vertical blades (5) arranged around the rotation shaft and attached to the rotation shaft through an arm (6a, 6b). Each of the blades (5) includes a blade main part (5a) and blade-tip inclined parts (5b) extending from upper and lower ends of the blade main part (5a) toward the rotation shaft (3a). Each of the blade-tip inclined parts (5b) has a smaller thickness than a thickness of the blade main part (5a). A wind power generating device (1) includes a vertical axis wind turbine (2) having the above configuration and a generator (3).

6 Claims, 11 Drawing Sheets

(56) References Cited

U.S. PATENT DOCUMENTS

2007/0071604 A1     3/2007   Suzuki
2019/0041015 A1     2/2019   Ito et al.

FOREIGN PATENT DOCUMENTS

| JP | 2006-118384 | | 5/2006 |
| JP | 2010-116921 | A | 5/2010 |
| JP | 2016-75241 | A | 5/2016 |
| JP | 5969651 | B1 | 8/2016 |
| JP | 2016-205204 | | 12/2016 |
| WO | 2013/024515 | A | 2/2013 |
| WO | WO 2016/148016 | A1 | 9/2016 |
| WO | WO 2017/179607 | A1 | 10/2017 |

OTHER PUBLICATIONS

International Preliminary Report on Patentability dated Dec. 10, 2020 with Written Opinion of the International Searching Authority issued in International Patent Application No. PCT/JP2019/020919.
Notice of Reasons for Refusal dated Sep. 7, 2021, in Japanese Application No. 2018-101989 (8 pages including translation).
Extended European Search Report dated Jan. 31, 2022 in European Patent Application No. 19810182.6.
First Examination Report dated Jul. 8, 2022 in Indian Patent Application No. 202017051128.

VERTICAL AXIS WIND TURBINE, AND WIND POWER GENERATING DEVICE AND LIGHTING FACILITY COMPRISING SAME

CROSS REFERENCE TO THE RELATED APPLICATION

This application is a continuation application, under 35 U.S.C. § 111(a), of international application No. PCT/JP2019/020919, filed May 27, 2019, which claims priority to Japanese patent application No. 2018-101989, filed May 29, 2018, the entire disclosures of all of which are herein incorporated by reference as a part of this application.

BACKGROUND OF THE INVENTION

Field of the Invention

The present invention relates to a vertical axis wind turbine including a plurality of blades around a vertical rotation shaft, a wind power generating device including the vertical axis wind turbine, and a lighting facility such as a street light which generates electricity using the wind power generating device and lights a lighting fitting.

Description of Related Art

Propeller type wind turbines are typically used as wind turbines in wind power generating devices. However, horizontal axis wind turbines represented by such propeller type wind turbines require wind direction control for aligning rotary blades with a direction of oncoming wind or have a major problem in terms of strength of support columns as well as maintenance of the wind turbines because heavy devices such as a generator are placed on top of the support columns due to their structure.

For this reason, vertical axis wind turbines are sometimes used in relatively small wind power generating devices. As for the vertical axis wind turbines, it has been proposed to provide a blade-tip inclined part at a blade tip in order to suppress a decrease in rotation efficiency of a rotary blade due to generation of a wingtip vortex, to enlarge a part for generating lift, and to prevent blade lengthwise flow of wind from the blade (for example, Patent Documents 1 to 3).

The invention described in Patent Document 1 is directed to a wind receiving blade to be vertically attached to a circumferential part of a rotary body, the wind receiving blade including a wind receiving part which has a swelling shape on a left side face in a front view so as to have a gradually decreasing thickness from its vertically central part toward its upper and lower parts and is formed with inclined parts at its upper and lower end edge portions such that the inclined parts extend threrefrom in an inclined manner toward the left side. The wind receiving part is a blade for a wind turbine, each of the wind receiving part and the inclined parts being bulged at its left front edge portion in a plan view so as to have a gradually decreasing thickness toward the rear, such that a negative pressure is generated in the area near the front edge portion of the left side (inner) face of the wind receiving part during rotation to generate a rotational thrust frontward and inward.

The inclined parts of the wind receiving part are inclined toward the left side at an angle in a range from 35° to 46° with respect to a perpendicular line passing through the center of the wind receiving part in a front view. The wind receiving part has a substantially triangular shape pointing frontward in a side view, and the inclined parts are formed at the rear of the wind receiving part.

The wind receiving blade is formed as a hollow body made of a fiber reinforced resin (FRP). As needed, the hollow body may be filled with a highly foaming resin. As a rear portion of the inner face of the wind receiving part is inclined outward with respect to a rotation direction, the wind flows rearward. Thus, the wind receiving part is pushed frontward so that a rotational thrust can be obtained.

The invention described in Patent Document 2 is directed to a vertical axis wind turbine including a vertical main shaft and elongated blades disposed around the vertical main shaft at predetermined intervals, each blade having upper and lower end portions formed with inclined parts inclined toward the vertical main shaft, and each blade having a chord length corresponding to about 40% to 55% of a radius of rotation of the blades. Each inclined part has an inclination angle of 10° or larger (preferably in a range from 30° to 45°), and each inclined part has a height corresponding to about 10% of the height of a blade.

The invention described in Patent Document 3 is directed to a wind turbine blade including a blade main part and a bent part formed at an end portion of the blade main part, the bent part being formed as a curved extension of a cross-sectional shape of the end portion along a curve having a predetermined curvature. An inclined part is formed as a curved extension of a cross-sectional shape of an upper end portion of the bent part, the curved extension having an outer-side contour, on an outer side thereof, extending along a curve having a predetermined curvature and an inner-side contour extending along a curve having a smaller curvature than that of the curve of the outer contour. The inclined part has side surfaces each having an outer ridge line defined by an intersection line of the outer-side contour and the inner-side contour. The wind turbine blade is characterized by the above features. The inclined part provided at a blade tip suppress a decrease in rotation efficiency of the blade due to generation of a wingtip vortex and highly efficiently generates lift for generating a rotational force of the blade not only from the blade main part, but also from the area of the inclined part of the blade.

In all the inventions described in Patent Documents 1 to 3, inclined parts are provided at blade tips of a vertical axis wind turbine so as to increase a rotation speed of the wind turbine, to improve rotation efficiency, and to improve starting characteristic as the wind turbine is more easily caused to rotate even upon receiving light wind.

RELATED DOCUMENT

Patent Document

[Patent Document 1] JP Laid-open Patent Publication No. 2004-204801
[Patent Document 2] JP Laid-open Patent Publication No. 2006-118384
[Patent Document 3] JP Laid-open Patent Publication No. 2016-205204

SUMMARY OF THE INVENTION

The inventions described in Patent Documents 1 to 3 are directed to technologies for improving rotation efficiency by providing an inclined part at a blade tip of a vertical axis wind turbine. The constructions of these documents, however, have problems in that the blades have a large mass because of the thick blade-tip inclined parts and, additionally, in that the blade-tip inclined parts are difficult to produce so that the manufacturing cost increases.

The present invention aims to solve the above problems, and an object of the present invention is to provide a vertical axis wind turbine, a wind power generating device, and a lighting facility including the same, which are capable of providing improved rotation efficiency and improved starting characteristic equivalent to those of a conventional and thick blade-tip inclined part and achieving weight saving and simplification of the manufacture.

A vertical axis wind turbine of the present invention includes:
  a vertical rotation shaft; and
  a plurality of vertical blades arranged around the rotation shaft and attached to the rotation shaft through an arm, wherein
  each of the blades includes a blade main part and a pair of blade-tip inclined parts extending from upper and lower ends of the blade main part toward the rotation shaft, and
  each of the blade-tip inclined parts has a smaller thickness than a thickness of the blade main part.

According to this configuration, each blade includes the blade-tip inclined parts extending toward the rotation shaft at the upper and lower ends of the blade main part, so that this configuration can provide the effects of suppressing a decrease in rotation efficiency of the blade due to generation of a wingtip vortex, increasing a total blade area so as to increase lift or drag of the blade, suppressing vertical flow of wind from the blade so as to increase a rotation force, and improving starting characteristic, as in a vertical axis wind turbine having a conventional and thick blade-tip inclined part. Also, since the blade-tip inclined part has a smaller thickness than that of the blade main part, it has a reduced weight compared with a conventional and thick blade-tip inclined part, so that startability upon receiving light wind is improved, and the manufacture is simplified.

Thus, it is possible to achieve weight saving and simplification of the manufacture of the blade while providing improved rotation efficiency and improved starting characteristic equivalent to those of a conventional structure.

In the vertical axis wind turbine of the present invention, the thickness of each of the blade-tip inclined parts may be constant from a base end to a tip end of the blade-tip inclined part.

Where the thickness of each blade-tip inclined part is constant, the blade-tip inclined part can be formed from a flat plate material so that the manufacture is further simplified.

In the vertical axis wind turbine of the present invention, the thickness of each of the blade-tip inclined part may gradually decrease from a base end to a tip end of the blade-tip inclined part.

Where the thickness of each blade-tip inclined part gradually decreases from its base end to its tip end, the blade-tip inclined part has excellent strength because the blade-tip inclined part has a greater thickness toward the base end side where a stronger load is applied due to a wind force.

In the vertical axis wind turbine of the present invention, each of the blade-tip inclined parts may be made of a steel plate or a resin material.

Where the blade-tip inclined part is made of a steel plate or a resin material, the blade-tip inclined part can be produced further more easily. The blade-tip inclined part may be produced as a separate component from the blade main part and be attached to the blade main part, so that the manufacture can be further simplified.

In the vertical axis wind turbine of the present invention, the blade main part may have a substantially constant cross-sectional shape over an entire length of the blade main part.

Where the blade main part has a constant cross-sectional shape over the entire length thereof, the blade main part can be easily manufactured thanks to its simple structure.

In the vertical axis wind turbine of the present invention, the blade main part may have a lift type cross-sectional shape for receiving a wind force to generate lift.

Where the blade main part has a lift type cross-sectional shape, it has excellent efficiency in comparison with a blade main part having a drag type cross-sectional shape. By providing the blade main part of a lift type with the blade-tip inclined parts each having a smaller thickness than that of the blade main part, the blade-tip inclined parts can effectively exhibit the above-described effects.

A wind power generating device of the present invention includes:
  the vertical axis wind turbine according to any of the above configurations of the present invention; and
  a generator configured to generate electricity from rotation of the vertical axis wind turbine transmitted to the generator.

According to the wind power generating device having this configuration, the above effects of the vertical axis wind turbine of the present invention can be obtained, so that it is possible to achieve weight saving and simplification of the manufacture of the blades while providing improved rotation efficiency and improved starting characteristic equivalent to those of a configuration having a conventional and thick blade-tip inclined part.

A lighting facility having a power generation function according to the present invention includes:
  the wind power generating device of the present invention;
  a photovoltaic panel;
  a secondary battery configured to store electricity generated by the wind power generating device and the photovoltaic panel; and
  a lighting fitting configured to light up using the electricity stored in the secondary battery; and
  a support column supporting the wind power generating device, the photovoltaic panel, the secondary battery, and the lighting fitting.

According to this configuration, the electricity generated by the wind power generating device and the photovoltaic panel is stored in the secondary battery and is used to light the lighting fitting at night and the like. The photovoltaic panel generates electricity in the daytime. The wind power generating device has high rotation efficiency because it is provided with the blade-tip inclined parts and has high power generation capability even at low wind speeds.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures.

DESCRIPTION OF THE EMBODIMENTS

Figure 1:
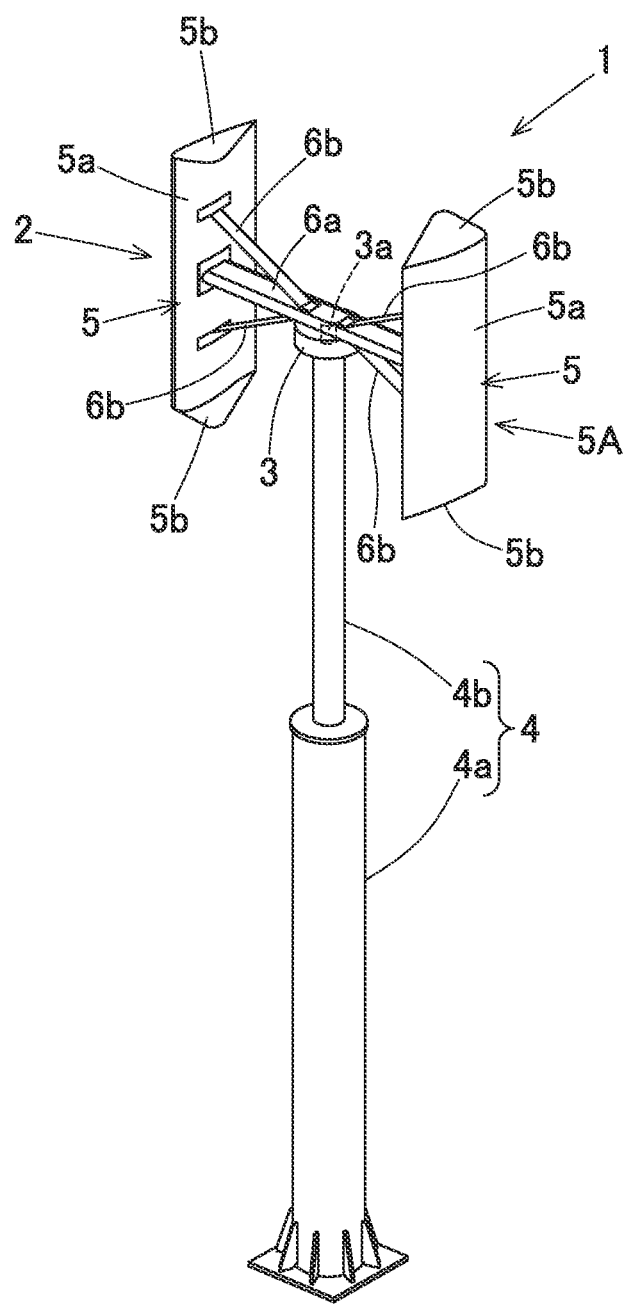
FIG. 1 is a perspective view of a wind power generating device according to a first embodiment of the present invention.
Figure 2:
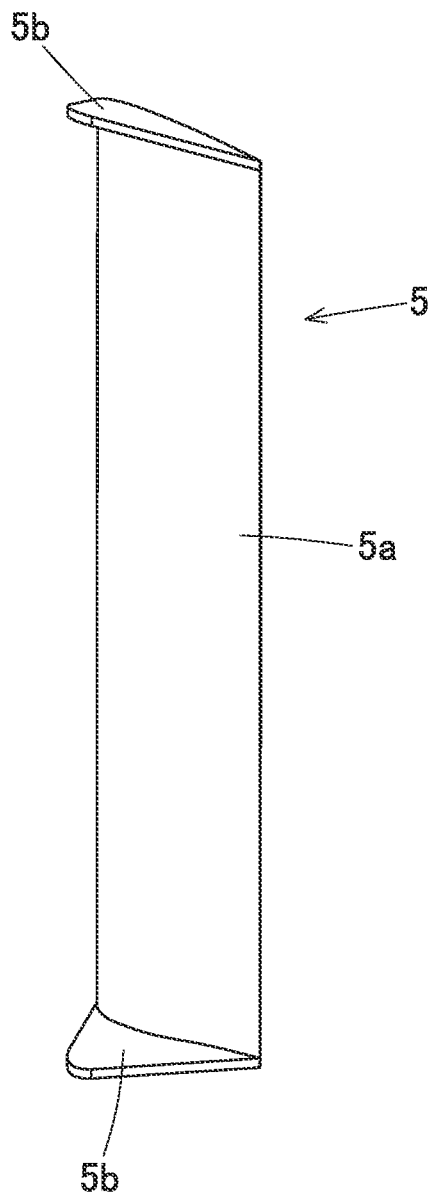
FIG. 2 is a perspective view illustrating an example of a blade for a vertical axis wind turbine of the wind power generating device.
Figure 3:
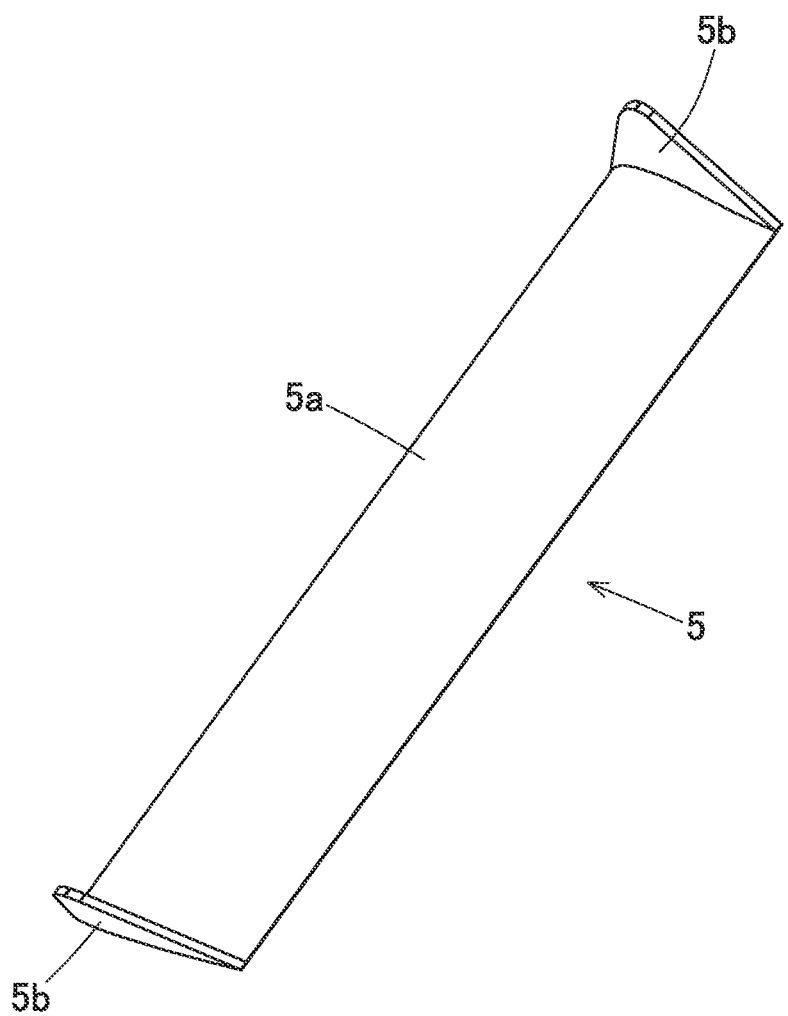
FIG. 3 is a perspective view of the blade as seen from a different direction from the direction of FIG. 2.
Figure 4:
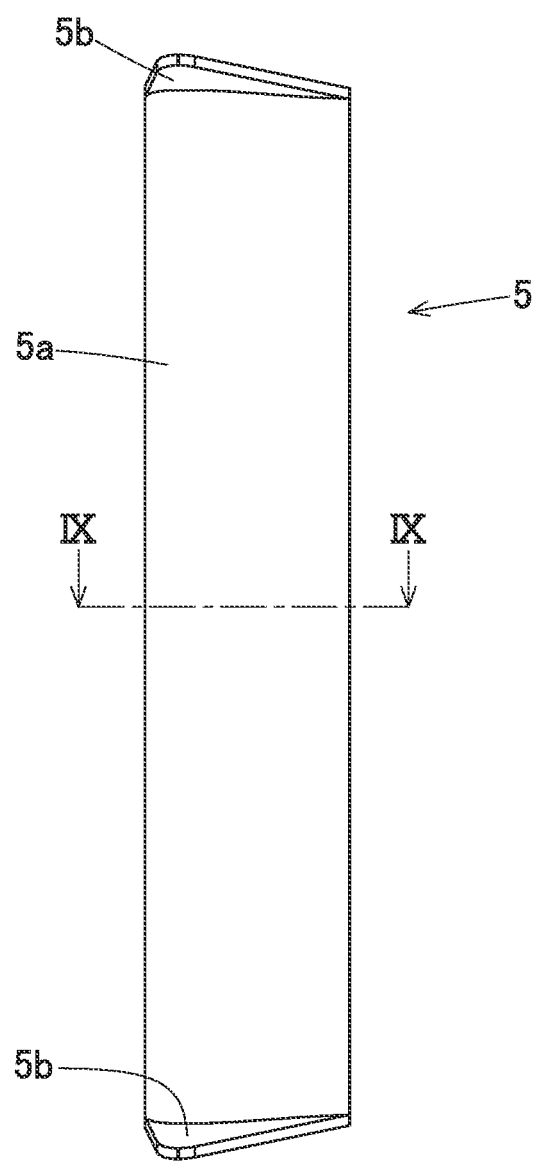
FIG. 4 is a front view of the blade as seen from a side of a rotation shaft.
Figure 5:
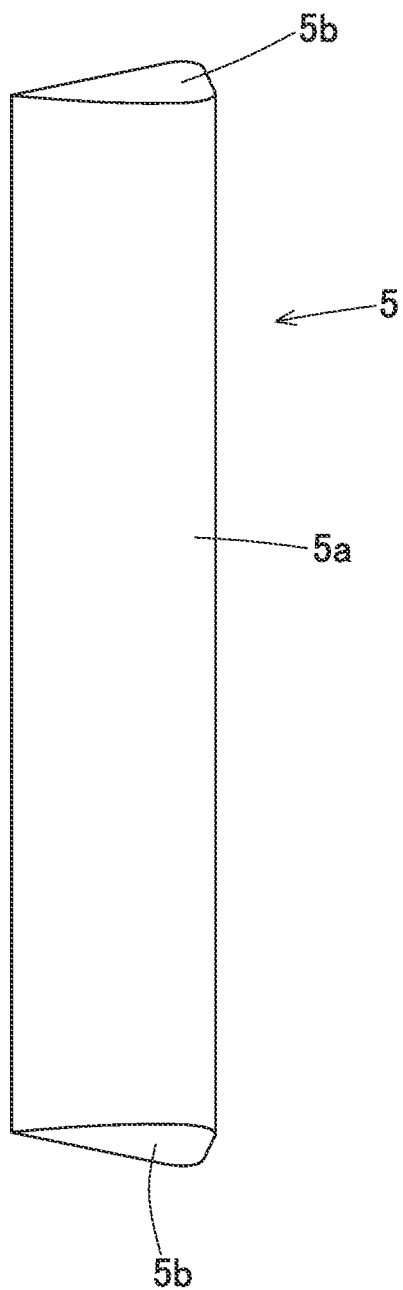
FIG. 5 is a back view of the blade as seen from an opposite side of FIG. 4.
Figure 6:
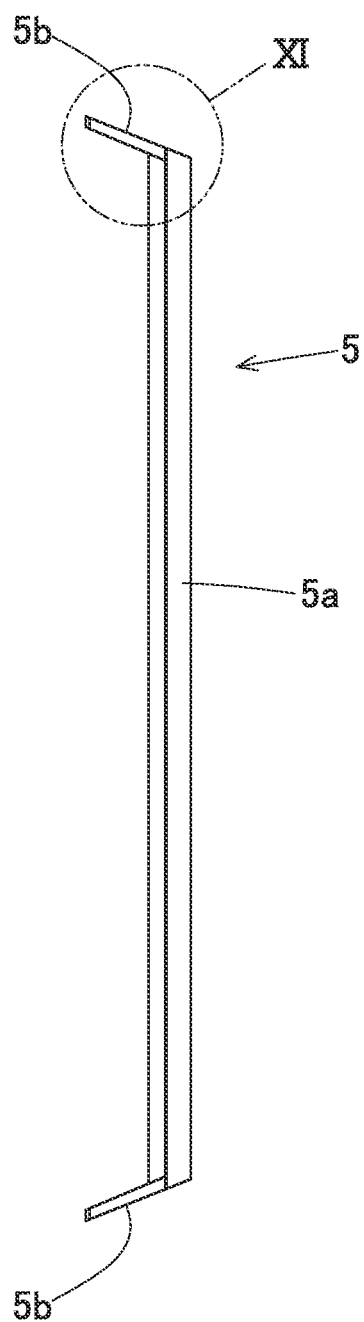
FIG. 6 is a right side view of the blade.
Figure 7:
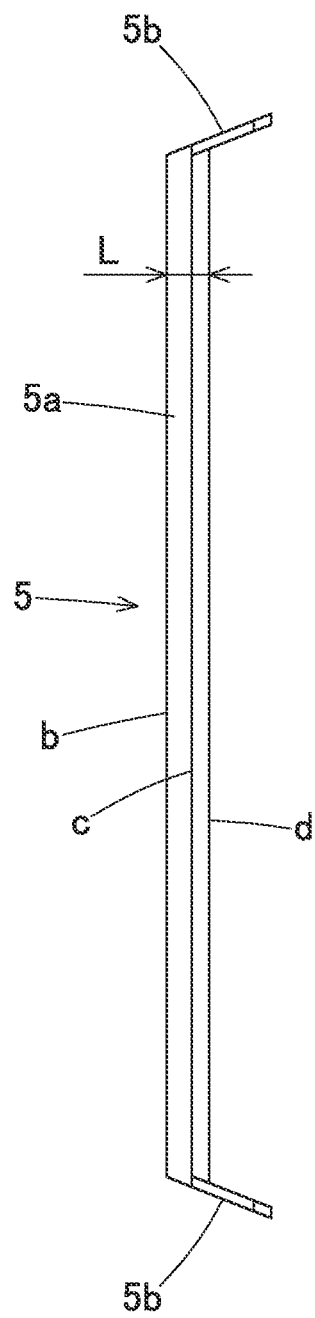
FIG. 7 is a left side view of the blade.
Figure 8:
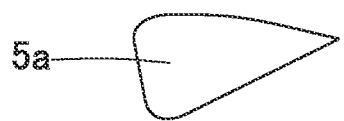
FIG. 8 is a plan view of the blade as seen from above in FIG. 4.

A wind power generating device according to a first embodiment of the present invention will be described with reference to FIG. 1 to FIG. 11. FIG. 1 shows the wind power generating device 1 including a vertical axis wind turbine 2 and a generator 3.

The vertical axis wind turbine 2 includes a plurality of (two in the illustrated example) vertical blades 5 attached to a rotation shaft 3a of the generator 3 through arms 6a, 6b. The plurality of blades 5 and the arms 6a, 6b constitute rotary blades 5A. A support column 4 includes a cylindrical large-diameter part 4a located on a lower side and a cylindrical small-diameter part 4b located on an upper side, and the generator 3 is mounted at an upper end portion protruding from an upper end of the small-diameter part 4b. The arms 6a, 6b include a main arm 6a arranged horizontally and centrally and upper and lower subsidiary arms 6b extending obliquely upward and obliquely downward from the main arm 6a or the generator 3 and having tip ends connected to the blades 5.

The generator 3 may be a permanent magnet synchronous generator or the like, which includes a rotor (not illustrated) supported at an upper end of the support column 4.

As shown in FIG. 2 to FIG. 11 in an enlarged manner, each blade 5 includes a blade main part 5a extending in a vertical direction and a pair of blade-tip inclined parts 5b, 5b extending from upper and lower ends of the blade main part 5a toward the rotation shaft 3a. The blade-tip inclined parts 5b have a smaller thickness than that of the blade main part 5a. The upper and lower blade-tip inclined parts 5b, 5b are shaped in a vertically symmetrical manner in the illustrated example.

Figure 9:
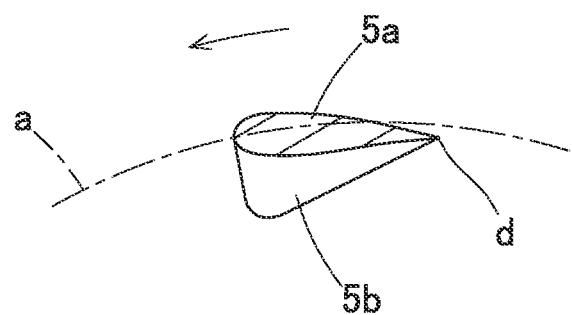
FIG. 9 is a sectional view of the blade along line IX-IX of FIG. 4.
Figure 10:
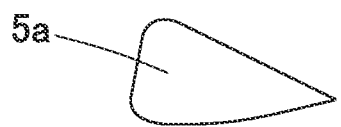
FIG. 10 is a bottom view of the blade as seen from below in FIG. 4.

The blade main part 5a has a constant cross-sectional shape over an entire length thereof. The blade main part 5a has a lift type cross-sectional shape in this embodiment, as illustrated in FIG. 9, which shows a cross section along line IX-IX of FIG. 4. In particular, the blade main part has substantially a fish shape which is bulged on a front edge side in a rotation direction (the direction of the arrow) with respect to a center in a widthwise direction of the blade main part and has a gradually decreasing thickness toward a rear edge side. In case of a lift type shape, the blades 5 has a fixed rotation direction. Also, the blades 5 are disposed in a direction in which the widthwise direction has a small angle of attack with respect to a tangential line of a blade rotation path a about a rotation axis of the generator 3. This is the reason why the left side view (FIG. 7) shows a line b (FIG. 7) representing a blade outer surface, a front edge c of the blade main part 5, and a line d of the blade main part 5 on a rotation center side (inner side), as seen from a tangential direction of the blade rotation path a in FIG. 9.

The cross-sectional shape of the blade main part 5a may have a drag type shape such as a flat plate-like shape.

Figure 11:
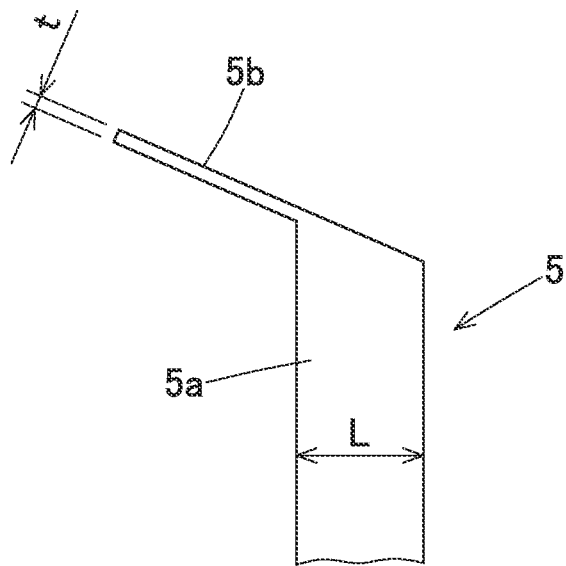
FIG. 11 is an illustration of dimensions of a blade-tip inclined part, which corresponds to an enlarged view of part XI of FIG. 6.

As illustrated in FIG. 11, which shows a thickness relation, each blade-tip inclined part 5b has a thickness t that is sufficiently smaller than a thickness L of the blade main part 5a. In the example of FIG. 11, the blade-tip inclined part 5b has a flat plate shape having a constant thickness over its entirety.

A ratio of the thickness t of the blade-tip inclined part 5b to the thickness L of the blade main part 5a may be, for example, 1/10 or smaller. A bent angle of the blade-tip inclined part 5b relative to the blade main part 5a may be, for example, from 30° to 80°. A length of each blade-tip inclined part 5b may be, for example, from about 5 to 30% of an entire length of the blade main part 5a.

As shown in FIG. 2, FIG. 3 and FIG. 8 to FIG. 10, the blade-tip inclined part 5b has a planar shape which protrudes most significantly at a position in the widthwise direction where the blade main part 5a has a largest thickness and protrudes less and less toward a front end and a rear end of the blade-tip inclined part.

Figure 12:
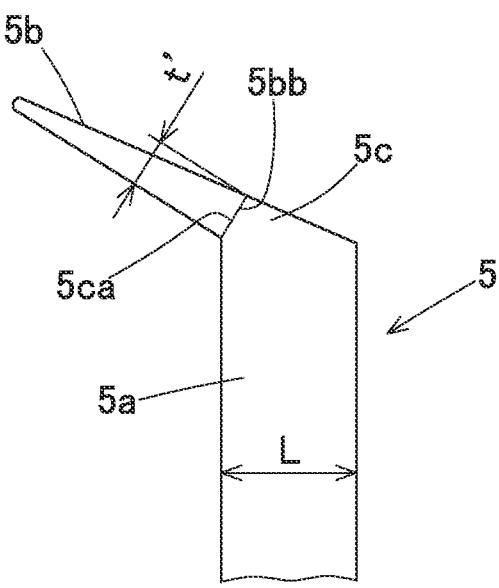
FIG. 12 illustrates a variant of the blade in the same manner as FIG. 11.

The blade-tip inclined part 5b may have a shape having a gradually decreasing thickness from the base end to the tip end as shown in FIG. 12, instead of having a constant thickness over its entirety. Even in this case, the base end of the blade-tip inclined part 5b has a sufficiently smaller thickness t' than the thickness L of the blade main part 5a. Where the blade-tip inclined part is shaped so as to have a gradually decreasing thickness, the tip end of the blade main part 5a is provided with a connection part 5c having a triangular cross-sectional shape, and a base end 5bb of the blade-tip inclined part 5b is connected to a side 5ca of the cross section of the connection part 5c.

The material of the blades 5 may be a resin material such as a fiber reinforced plastic or a metal material such as a steel plate or an aluminum material. Alternatively, the blades may be made of multiple materials. The blade main part 5a may be solid or hollow. Where the blade main part is hollow, for example, the blade main part is constructed by a frame (not illustrated) including ribs having a cross-sectional shape of the blade and arranged at plurality of positions in a blade lengthwise direction and a plurality of girder members extending in the blade lengthwise direction, and surface plates (not illustrated) attached to the frame so as to constitute front and rear sides of the blade.

Figure 13:
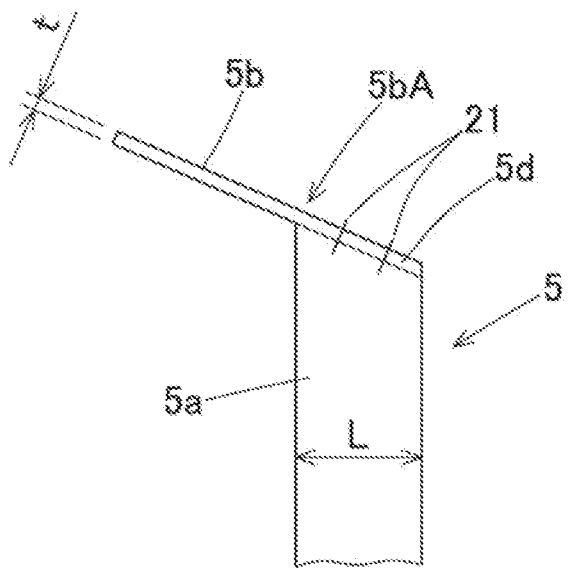
FIG. 13 illustrates an example of an attachment structure for the blade-tip inclined part of FIG. 11.

The blade-tip inclined part 5b may be integrally formed with the blade main part 5a or be produced as a separate member from the blade main part 5a and attached to the blade main part 5a. Where the blade-tip inclined part 5b is produced as a separate component from the blade main part 5a, for example, as shown in FIG. 13, a blade-tip inclined part constituting member 5bA including the blade-tip inclined part 5b and an attachment part 5d may be attached to the blade main part 5a with a fixing tool 21 such as a bolt or an adhesive.

Figure 14:
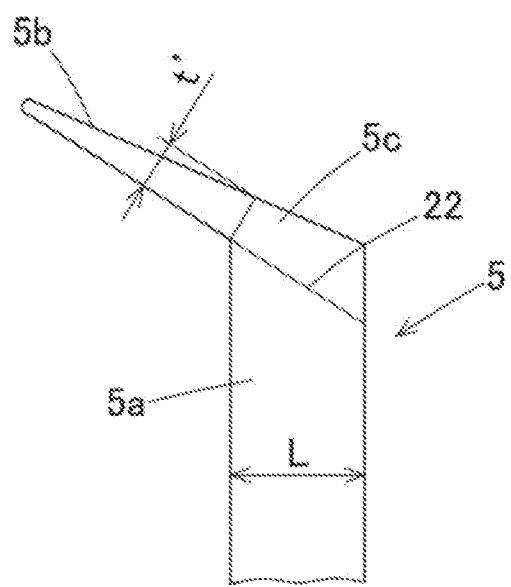
FIG. 14 illustrates the example of the attachment structure for blade-tip inclined part of FIG. 12.

FIG. 14 shows an example in which, where the blade-tip inclined part 5b is shaped so as to have a gradually decreasing thickness from its base end to its tip end as in the example of FIG. 12, the blade-tip inclined part 5b is produced as a separate member from the blade main part 5a and is attached to the blade main part 5a at a joining surface 22 that is a base end surface of the blade-tip inclined part 5b, with an adhesive or a fixing tool such as a bolt and a nut (not illustrated).

According to this configuration, each blade 5 includes the blade-tip inclined parts 5b extending from upper and lower ends of the blade main part 5a toward the rotation shaft 3a, so that this configuration can provide the effects of suppressing a decrease in rotation efficiency of the blade due to generation of a wingtip vortex, increasing a total blade area so as to increase lift of the blade 5, suppressing vertical flow of wind from the blade 5 so as to increase a rotation force, and improving starting characteristic, as in a vertical axis wind turbine having a conventional and thick blade-tip inclined part. Also, since the blade-tip inclined part 5b has a smaller thickness than that of the blade main part 5a, it has a reduced weight compared with a conventional and thick blade-tip inclined part, so that startability upon receiving light wind is improved, and the manufacture is simplified.

Thus, it is possible to achieve weight saving and simplification of the manufacture of the blade 5 while providing improved rotation efficiency and improved starting characteristic equivalent to those of a conventional structure.

Where the blade-tip inclined part 5b has a constant thickness from a base end to a tip end of the blade-tip inclined part as shown in FIG. 11 and FIG. 13, the blade-tip inclined part 5b can be formed from a plate material so that the manufacture is further simplified.

Where the blade-tip inclined part 5b has a gradually decreasing thickness from the base end to the tip end as shown in the example of FIG. 12 and FIG. 14, the blade-tip inclined part 5b has excellent strength because the blade-tip inclined part has a greater thickness toward the base end side where a stronger load is applied due to a wind force.

Where the blade-tip inclined part 5b is made of a steel plate or a resin material, the blade-tip inclined part 5b can be produced further more easily. The blade-tip inclined part 5b can be produced as a separate component from the blade main part 5a as in the example of FIG. 13 and FIG. 14 and be attached to the blade main part 5a, so that the manufacture can be further simplified.

Where the blade main part 5a has a substantially constant cross-sectional shape over the entire length thereof, the blade main part 5a can be more easily manufactured thanks to its simple structure. By providing the blade main part 5a of a lift type with the blade-tip inclined part 5b having a smaller thickness than that of the blade main part 5a, the blade-tip inclined part 5b can effectively exhibit the above-described effects.

Figure 15:
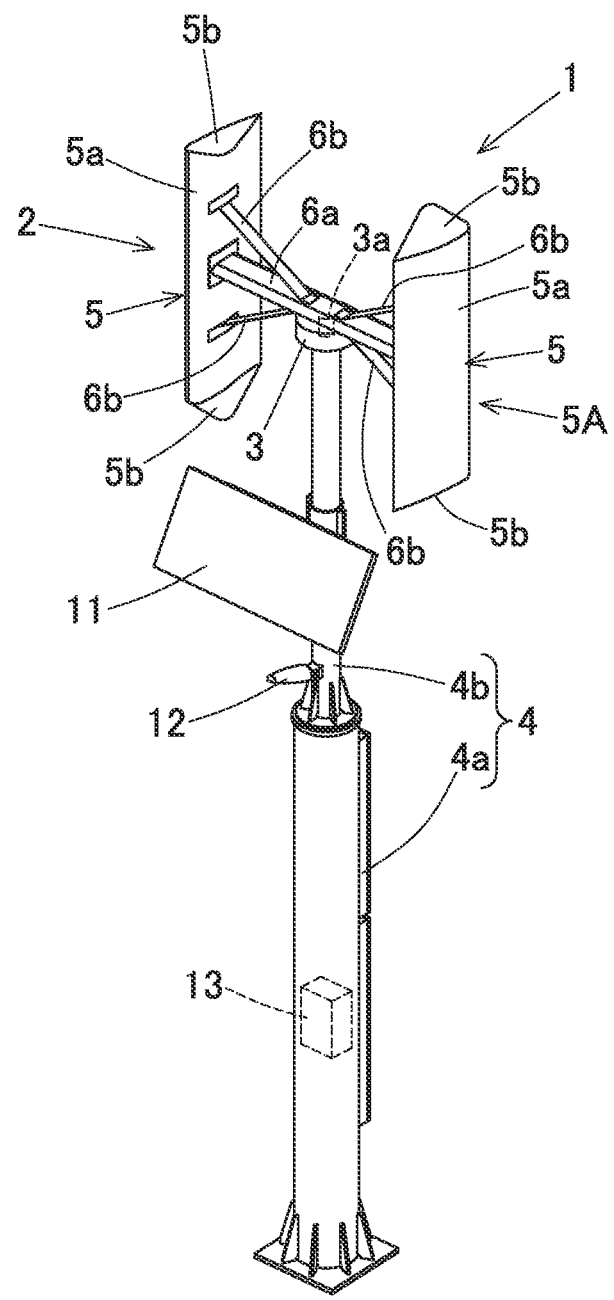
FIG. 15 is a perspective view of a lighting facility with a power generation function according to a second embodiment of the present invention.

FIG. 15 shows a lighting facility with a power generation function according to a second embodiment of the present invention, the lighting facility including a wind power generating device 1. The lighting facility with a power generation function in FIG. 15 is configured as a lighting facility to be installed as a street light or a lamppost on a street or in a park, and the lighting facility includes a support column 4, a vertical axis wind turbine 2 of the wind power generating device 1 disposed on top of the support column, a photovoltaic panel 11, a lighting fitting 12, and a plurality of secondary batteries 13 inside a large-diameter part 4a of the support column 4. The photovoltaic panel 11 is attached to a small-diameter part 4b of the support column 4, and the lighting fitting 12 is attached to the small-diameter part 4b of the support column 4 at a position below the photovoltaic panel 11. The lighting fitting 12 may include a light source such as an LED, which may run on direct current or alternating current to be lighted.

The wind power generating device 1 is configured in the same manner as the wind power generating device 1 according to the first embodiment shown in FIG. 1 to FIG. 11 and is provided with blade-tip inclined parts 5b at upper and lower ends of the blades 5.

The lighting facility stores the electricity generated by the wind power generating device 1 and the photovoltaic panel 11 in the secondary batteries 13 and uses the stored electricity to turn on the lighting fitting 12 at night and the like. Since the wind power generating device 1 has high rotation efficiency because the blades 5 are provided with the blade-tip inclined parts 5b as described above, the wind power generating device has an advantage that it has high power generation capability even at low wind speeds. In addition, the photovoltaic panel 11 and the wind power generating device 1 generate electricity in the daytime.

Although, in the above embodiments, each blade-tip inclined part 5b forms a bend and extends linearly from the blade main part 5a, the blade-tip inclined part 5b may have a curved cross section along a protrusion direction of the blade-tip inclined part.

Although the present invention has been described in terms of the preferred embodiments thereof with reference to the drawings, those skilled in the art would readily arrive at various changes and modifications in view of the present specification without departing from the scope of the invention. Accordingly, such changes and modifications are included within the scope of the present invention defined by the appended claims.

REFERENCE NUMERALS

1 . . . Wind power generating device
2 . . . Vertical axis wind turbine
3 . . . Generator
3a . . . Rotation shaft
4 . . . Support column
5 . . . Blade
5a . . . Blade main part
5b . . . Blade-tip inclined part
6a, 6b . . . Arm
11 . . . Photovoltaic panel
12 . . . Lighting fitting
13 . . . Secondary battery

What is claimed is:
1. A vertical axis wind turbine comprising:
a vertical rotation shaft; and a plurality of vertical blades arranged around the vertical rotation shaft and attached to the vertical rotation shaft through an arm, wherein each of the plurality of vertical blades includes a blade main part and a pair of blade-tip inclined parts, each of the pair of blade-tip inclined parts having an end which extends from upper and lower ends of the blade main part toward the vertical rotation shaft and another end which does not extend from the upper and lower ends of the blade main part, each of the blade-tip inclined parts has a smaller thickness than a thickness of the blade main part, such that a ratio of a thickness of each of the blade-tip inclined parts to the thickness of the blade main part is 1 to 10, or less, and the thickness of each of the blade-tip inclined parts, which extend from the upper and lower ends of the blade main part toward the vertical rotation shaft, is constant from a base end to a tip end of the blade-tip inclined part.

2. The vertical axis wind turbine as claimed in claim 1, wherein each of the blade-tip inclined parts is made of a steel plate or a resin material.

3. The vertical axis wind turbine as claimed in claim 1, wherein the blade main part has a substantially constant cross-sectional shape over an entire length of the blade main part.

4. The vertical axis wind turbine as claimed in claim 1, wherein the blade main part has a lift type cross-sectional shape for receiving a wind force to generate lift.

5. A wind power generating device comprising:
the vertical axis wind turbine as claimed in claim 1, and
a generator configured to generate electricity from rotation of the vertical axis wind turbine transmitted to the generator.

6. A lighting facility having a power generation function comprising:
the wind power generating device as claimed in claim 5;
a photovoltaic panel;
a secondary battery configured to store electricity generated by the wind power generating device and the photovoltaic panel; and
a lighting fitting configured to light up using the electricity stored in the secondary battery; and
a support column supporting the wind power generating device, the photovoltaic panel, the secondary battery, and the lighting fitting.

* * * * *